United States Patent
Bird et al.

(10) Patent No.: US 9,273,611 B2
(45) Date of Patent: Mar. 1, 2016

(54) METHOD AND APPARATUS FOR IMPROVED TURBINE BELLYBAND ROTOR SEAL MACHINING, INSTALLATION AND LIFE

(71) Applicant: Siemens Energy, Inc., Orlando, FL (US)

(72) Inventors: Derek A. Bird, Oviedo, FL (US); David J. Mitchell, Oviedo, FL (US); Michael J. Olejarski, Merrit Island, FL (US)

(73) Assignee: Siemens Energy, Inc., Orlando, FL (US)

( * ) Notice: Subject to any disclaimer, the term of this patent is extended or adjusted under 35 U.S.C. 154(b) by 78 days.

(21) Appl. No.: 14/337,318

(22) Filed: Jul. 22, 2014

(65) Prior Publication Data

US 2016/0025012 A1    Jan. 28, 2016

(51) Int. Cl.
| | |
|---|---|
| *F02C 7/28* | (2006.01) |
| *B23P 6/00* | (2006.01) |
| *B23P 13/02* | (2006.01) |
| *B23B 47/28* | (2006.01) |
| *B23B 49/00* | (2006.01) |

(52) U.S. Cl.
CPC . *F02C 7/28* (2013.01); *B23B 47/28* (2013.01); *B23B 49/00* (2013.01); *B23P 6/002* (2013.01); *B23P 13/02* (2013.01); *F05D 2230/80* (2013.01)

(58) Field of Classification Search
CPC ......... B23B 49/00; B23B 47/28; B23P 13/02; B23P 6/002; F02C 7/02; F05D 2230/80
See application file for complete search history.

(56) References Cited

U.S. PATENT DOCUMENTS 5,284,406 A * 2/1994 Mueller .................. B23B 47/28
  408/241 B
8,402,625 B2 * 3/2013 Holmes ................... B23B 41/00
  29/281.4

* cited by examiner

*Primary Examiner* — Ryan J Walters

(57) ABSTRACT

A method and apparatus for improved turbine bellyband rotor seal machining, installation and life are disclosed. A fixture is provided which can be temporarily attached to the turbine disks in a position straddling the gap between the disks, without destacking the turbine rotor. The fixture accepts power tools including a drill and a mill, and positions the power tools to drill and grind a rectangular slot into the disks, where the slot has the exact size and shape needed to receive an anti-rotation block which is integral to the replacement bellyband. Measuring tools are also provided which enable precise location of each of the four slots which must be machined in the disks. The resulting slots have a uniform size and shape, and are equally spaced around the circumference of the disk, thereby facilitating installation of the service bellyband from four identical segments.

20 Claims, 9 Drawing Sheets

METHOD AND APPARATUS FOR IMPROVED TURBINE BELLYBAND ROTOR SEAL MACHINING, INSTALLATION AND LIFE

BACKGROUND OF THE INVENTION

1. Field of the Invention

This invention relates generally to improving the service installation of a bellyband seal between rotor disks in a gas turbine and, more particularly, to a method and corresponding fixtures and gages for installing a replacement bellyband in a turbine without destacking the rotor, including a compact machining fixture which can be used to precisely machine the rotor disks to accept engagement features of the bellyband, and layout tools for precisely locating the machining sites.

2. Description of the Related Art

Combustion gas turbines are clean-burning, efficient devices for generating power for a variety of applications. One common application of combustion gas turbines is in power plants, where the turbine drives a generator which produces electricity. Such stationary gas turbines have been developed over the years to improve reliability and efficiency. However, due to the long service life of modern gas turbines, some parts will inevitably need to be replaced.

One such part which typically needs to be replaced during the service life of a gas turbine is an air gap baffle, also known as a bellyband. A bellyband serves as a seal between adjacent rotor disks in a turbine, preventing the relatively low-temperature cooling air flowing through the central core of the turbine rotor from mixing with the hot combustion gases flowing past the blades in the annular combustion section outside the core. Because of the extreme heat and corrosive nature of the gases to which it is exposed, the bellyband often reaches its end of life and needs to be replaced before the turbine itself is due to be retired.

When a bellyband needs to be replaced, it is desirable to do so without destacking the turbine rotor, as destacking and restacking are lengthy procedures which cause the turbine to be out of service for a long period of time. Previous methods of bellyband replacement involve manually drilling and grinding slots in the rotor disks to accept anti-rotation devices which are integral to the replacement bellyband. These traditional methods suffer from several drawbacks. One drawback is that, despite best efforts at manual measurement of the slot locations, the four segments that make up the replacement bellyband often end up having slightly different lengths—meaning that each segment becomes a turbine-specific service part. Another drawback is that the manually machined slots in the rotor disks inevitably have a slightly irregular and non-optimal shape, which causes excess stress on both the rotor disks themselves and the replacement bellyband. These drawbacks add complexity to the service replacement of bellybands, and reduce the life of the service bellybands, both of which are undesirable.

SUMMARY OF THE INVENTION

In accordance with the teachings of the present invention, a method and apparatus for improved turbine bellyband rotor seal machining, installation and life are disclosed. A fixture is provided which can be temporarily attached to the turbine disks in a position straddling a gap between the disks, without destacking the turbine rotor. The fixture accepts power tools including a drill and a mill, and positions the power tools to drill and grind a rectangular slot into the disks, where the slot has the exact size and shape needed to receive an anti-rotation block which is integral to the replacement bellyband. Measuring tools are also provided which enable precise location of each of the four slots which must be machined in the disks. The resulting slots have a uniform size and shape, and are equally spaced around the circumference of the disk, thereby facilitating installation of the service bellyband from four identical segments.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and apparatus for improved turbine bellyband rotor seal machining and installation is merely exemplary in nature, and is in no way intended to limit the invention or its applications or uses.

Figure 1:
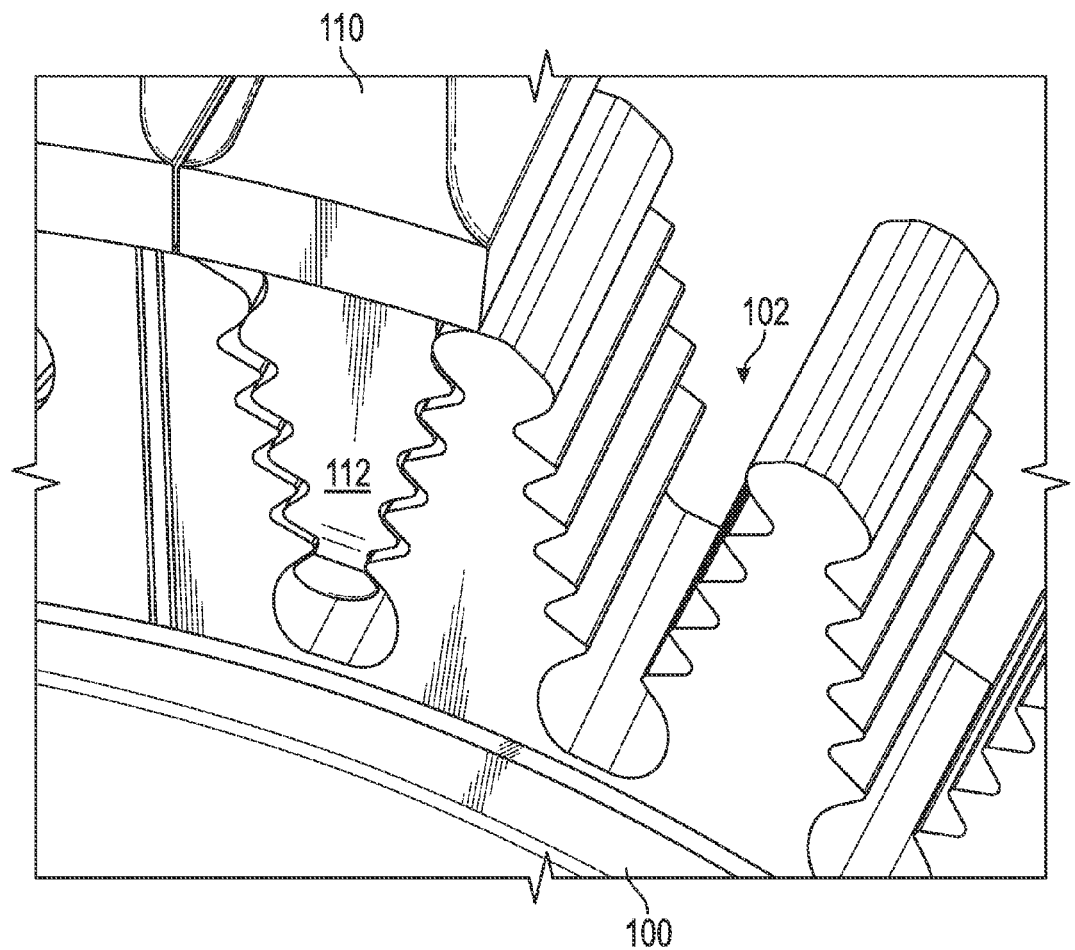
FIG. 1 is an illustration of a gas turbine rotor disk, showing an arrangement of turbine blades and features of the disk.

FIG. 1 is an illustration of a gas turbine rotor disk 100 and a plurality of turbine blades 110. In this design, the blade 110 has a blade root 112 with an inverted "fir tree" shape, and the rotor disk 100 has a complementary fir tree shaped cavity 102. The turbine blade 110 can be installed in the rotor disk 100 by simply sliding the blade 110 in a longitudinal direction (parallel to the rotational axis of the turbine) so that the fir tree shape of the blade root 112 engages with the mating cavity 102 in the rotor disk 100. In one typical gas turbine design, there are four of the disks 100—each with its respective set of the blades 110—arranged axially along a rotor shaft (not shown) in the turbine.

Figure 2:
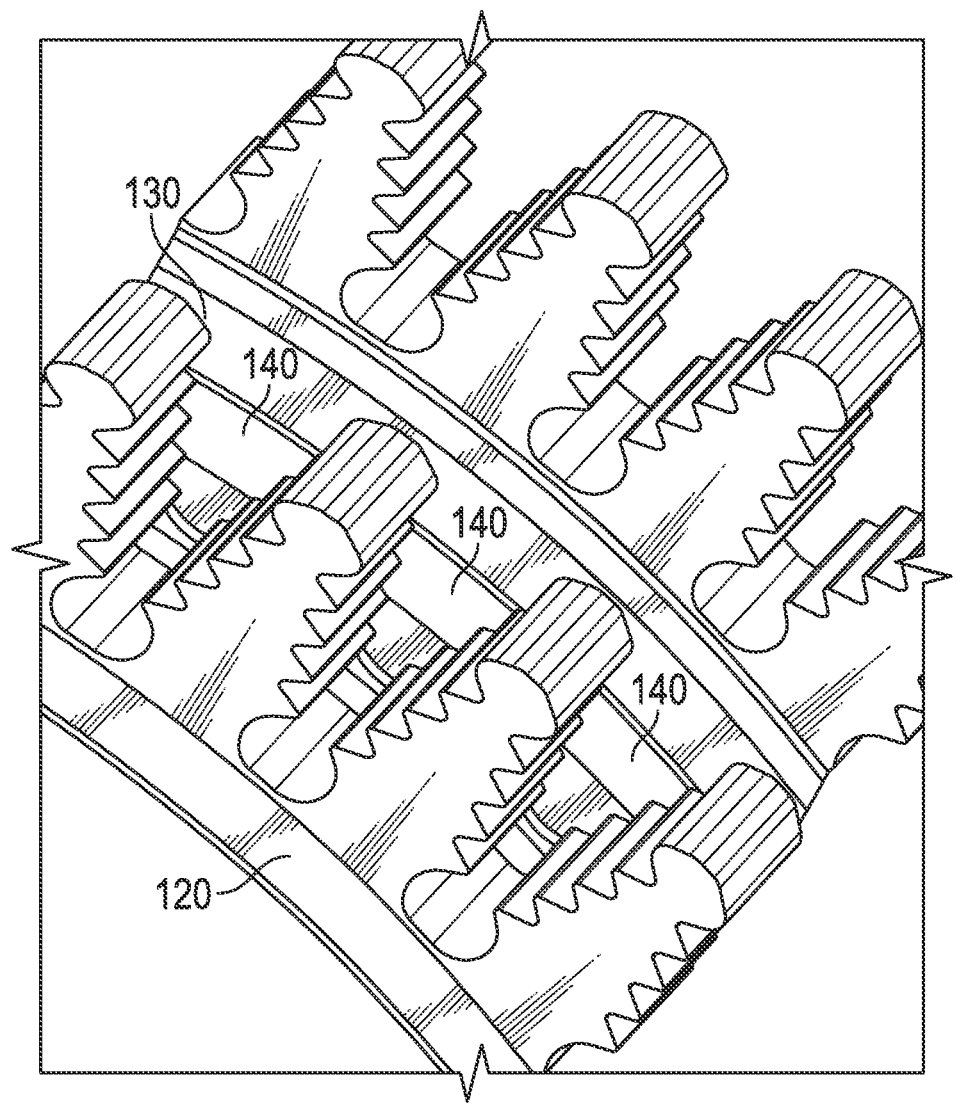
FIG. 2 is an illustration of two adjacent turbine disks and the gap therebetween.

FIG. 2 is an illustration of two adjacent turbine disks 120 and 130. The disks 120 and 130 could be any two adjacent disks ($1^{st}$ and $2^{nd}$ row; $2^{nd}$ and $3^{rd}$ row; etc.) in a gas turbine. In any such turbine design, a gap 140 exists between a fore edge of the disk 130 and an aft edge of the disk 120. The gap 140 must be covered in order to prevent cooling air flowing through the central core of the turbine from mixing with hot combustion gases flowing past the blades 110 in the annular combustion section outside the core.

Figure 3:
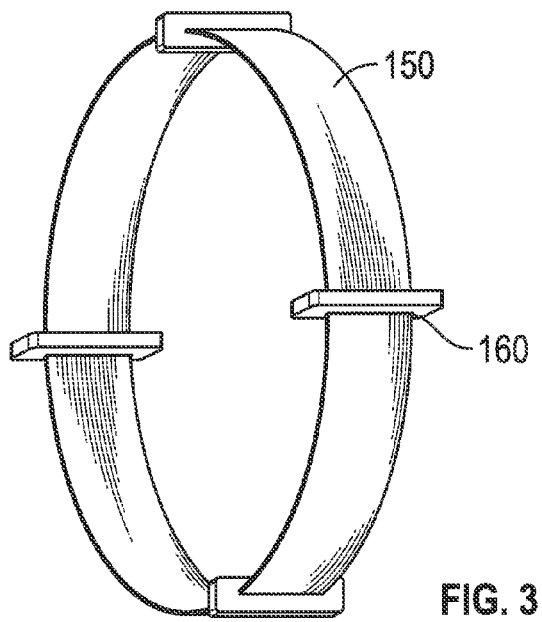
FIG. 3 is an illustration of a bellyband which can be used to seal the gap between the two adjacent turbine disks of FIG. 2.

FIG. 3 is an illustration of a bellyband 150 which can be used to seal the gap 140 between the two adjacent turbine disks 120 and 130. The bellyband 150 includes a plurality of anti-rotation devices 160. The anti-rotation devices 160 are block-shaped components which fit into slots in the disks 120 and 130 and prevent rotation or other movement of the bellyband 150 relative to the disks 120 and 130. Four of the anti-rotation devices 160 are shown on the bellyband 150 of FIG. 3, although more or fewer could be used. In a typical design which is used for service replacement on a turbine, the bellyband 150 is comprised of four segments, each including one of the anti-rotation devices 160.

Figure 4:
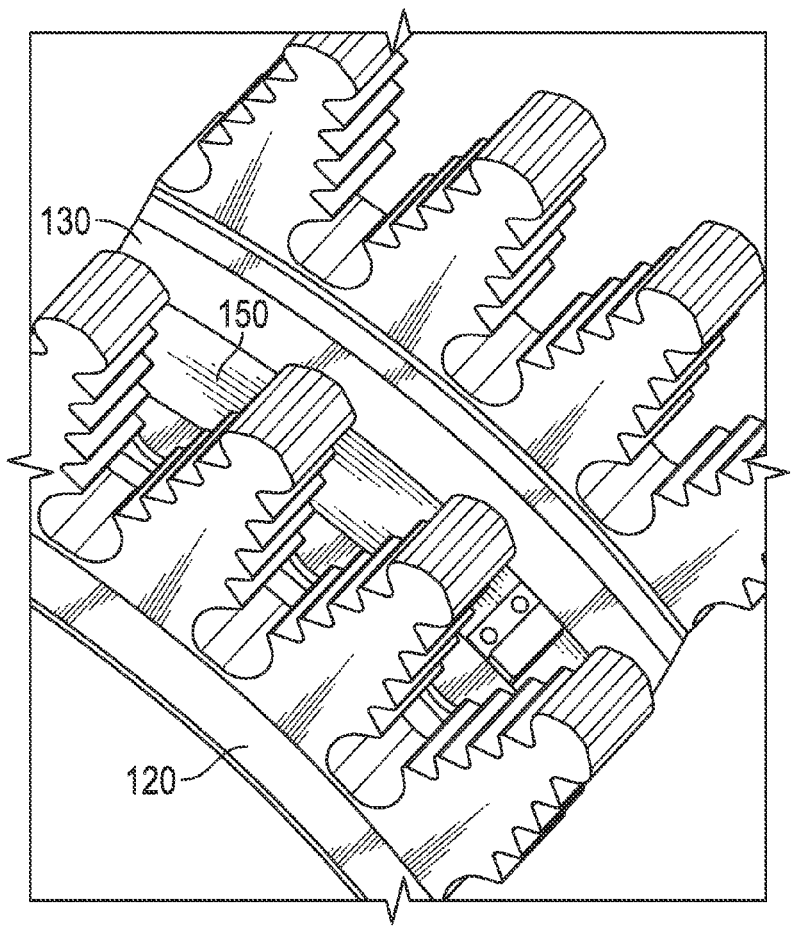
FIG. 4 is an illustration of two adjacent turbine disks where the gap between the disks is covered by a bellyband.

FIG. 4 is an illustration of the two adjacent turbine disks 120 and 130 where the gap 140 between the disks is covered by the bellyband 150. The bellyband 150 is typically constructed of a nickel-based superalloy with excellent high-temperature properties, because of the extreme heat and corrosive nature of the gases to which it is exposed. Even so, the bellyband 150 often reaches its end of life and needs to be replaced before the turbine itself is due to be retired.

When performing a service replacement of the bellyband 150, it is highly desirable to do so without destacking the rotor—that is, removing the disks 120 and 130 from the rotor assembly—as rotor destacking and restacking are major operations which cause the turbine to be out of service for a long time. Furthermore, a service replacement of the bellyband 150 requires the disks 120 and 130 to be modified to accept the anti-rotation devices 160 which are incorporated into the bellyband 150 which is used in service replacement. Because of the limited space which exists between outer portions of the disks 120 and 130, hand tools have been traditionally employed to manually drill and grind slots into the disks 120 and 130 to accept the anti-rotation devices 160. As a result of the manual grinding operation, the slots in the disks 120 and 130 have typically been irregularly sized and shaped, have had poor edge finish quality, and were unevenly spaced around the circumference of the disks 120 and 130. These problems have dictated that the replacement bellyband 150 be comprised of four different-sized segments, and also shortened the life of both the disks 120 and 130 and the replacement bellyband 150 due to stress concentrations. The methods and devices described in the remainder of this disclosure are designed to solve these problems.

Figure 5:
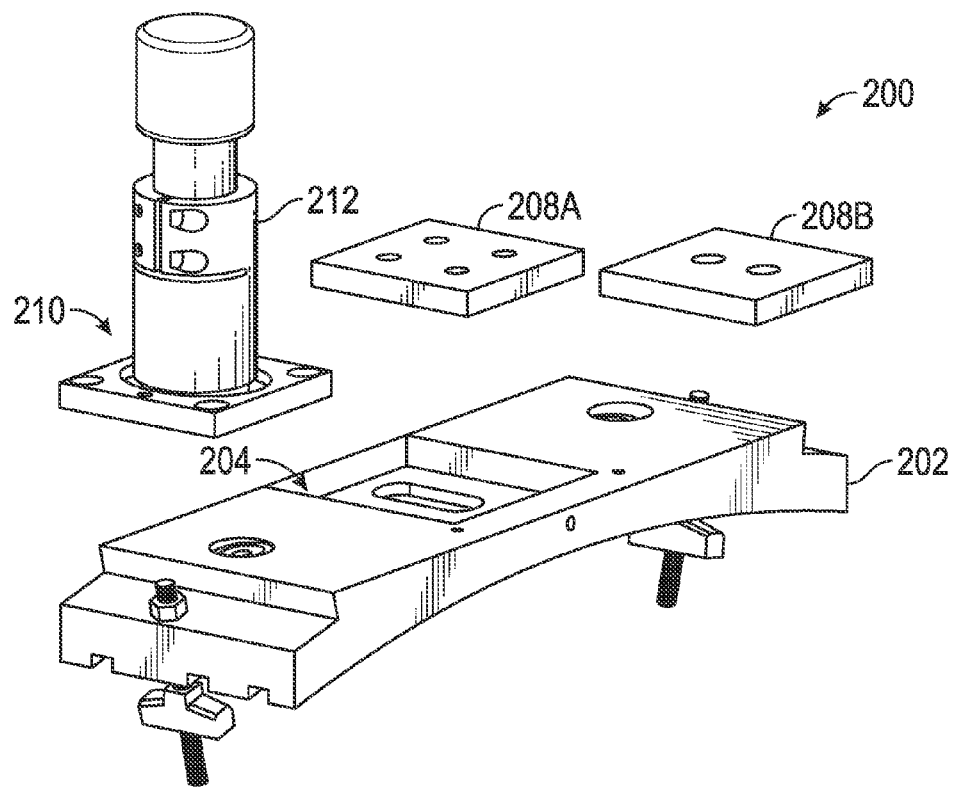
FIG. 5 is a first perspective view of a tooling fixture which can be used to machine a slot in the two adjacent turbine disks, where the slot accepts an anti-rotation device which is integral to the bellyband.
Figure 6:
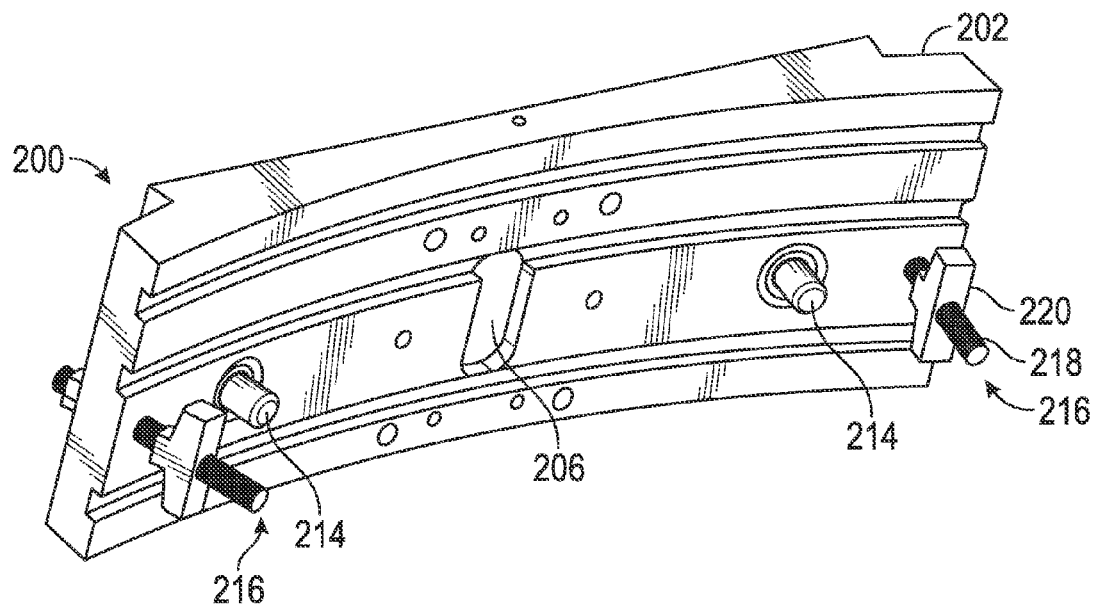
FIG. 6 is a second perspective view of the tooling fixture of FIG. 5.

FIGS. 5 and 6 are first and second perspective views, respectively, of a tooling fixture 200 which can be used to machine the slot in the adjacent turbine disks 120 and 130, where the slot accepts the anti-rotation devices 160 which are integral to the replacement bellyband 150. The fixture 200 includes a body 202 with a lower surface which has a curvature designed to match the outside diameter of the disks 120 and 130. The body 202 also includes a pocket 204 in an upper surface. An opening 206 passes all the way through the body 202, central to the pocket 204. The pocket 204 is designed to receive drilling inserts 208-NB and a milling insert 210, discussed below. The drilling and milling of the slot in the disks 120 and 130 is performed through the opening 206.

The drilling inserts 208-NB are fitted in sequence in the pocket 204 of the body 202 and used to precisely drill holes in the disks 120 and 130, where the holes are the first steps in creating the slot, as will be discussed and shown below. The drilling inserts 208-A/B include hardened drill guides which allow the initial holes to be drilled in the proper location relative to the disks 120 and 130 and relative to each other. After the holes are drilled, the drilling inserts 208-NB are removed and the milling insert 210 is fitted in the pocket 204 of the body 202 and is used to precisely finish the machining of the slot in the disks 120 and 130. The milling insert 210 includes an air turbine 212 which follows a generally rectangular template to machine the slot. The drilling inserts 208-NB and the milling insert 210 can be secured in the pocket 204 of the body 202 in any suitable fashion, such as by use of bolts at all four corners.

The fixture 200 is positioned and held in place relative to the disks 120 and 130 by a pair of alignment pins 214 and a pair of toggle bolts 216. The alignment pins 214 are screwed onto the lower surface of the body 202. In one turbine design, the gap 140 between the disks 120 and 130 is nominally about 0.5", but the size of the gap 140 may vary slightly based on design and build tolerances. The alignment pins 214 come in a series of closely-spaced sizes, where the proper size set of the alignment pins 214 can be chosen and installed on the body 202 such that the alignment pins 214 just fit in the gap 140 with essentially no looseness. This allows exact placement of the fixture 200 relative to the disks 120 and 130, such that the fixture 200 is centered over the gap 140.

The toggle bolts 216 pass through the body 202, and consist of a toggle 218 and a bolt 220. When the fixture 200 is to be mounted to the disks 120 and 130, the toggle bolts 216 are placed down into the gap 140 between the disks 120 and 130, the toggles 218 are turned 90 degrees, and the bolts 220 are tightened from above so that the toggles 218 bear against the underside of the flanges of the disks 120 and 130. Using the alignment pins 214 and the toggle bolts 216, the fixture 200 can be securely mounted in a desired location on the disks 120 and 130, where the slot can be machined.

Figure 7:
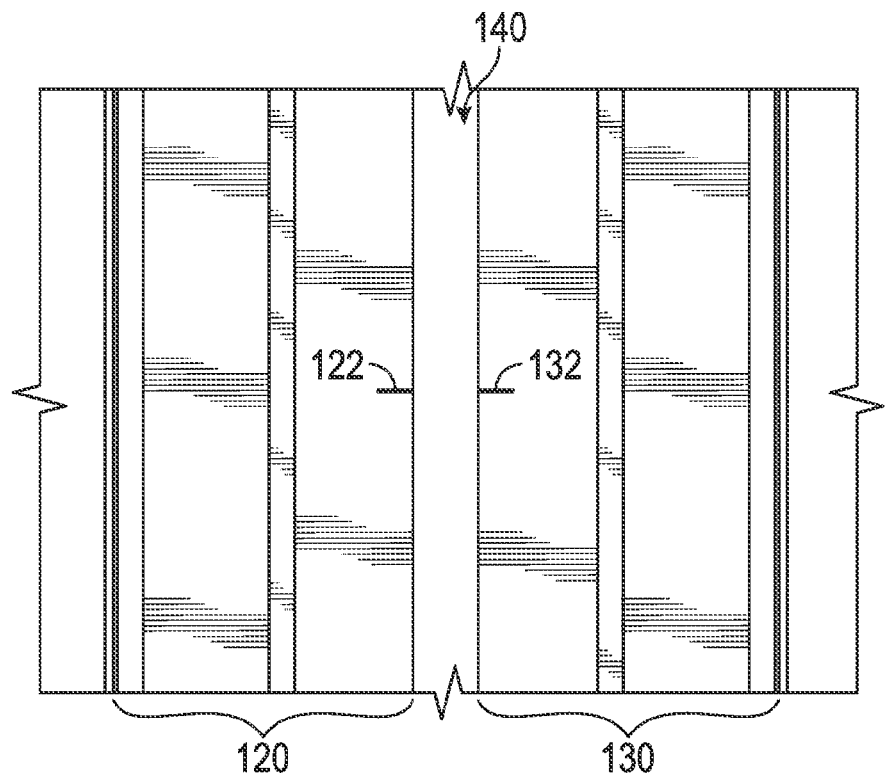
FIG. 7 is an illustration of the two adjacent turbine disks with a scribe line indicating a location where a slot for an anti-rotation device is to be machined.
Figure 8:
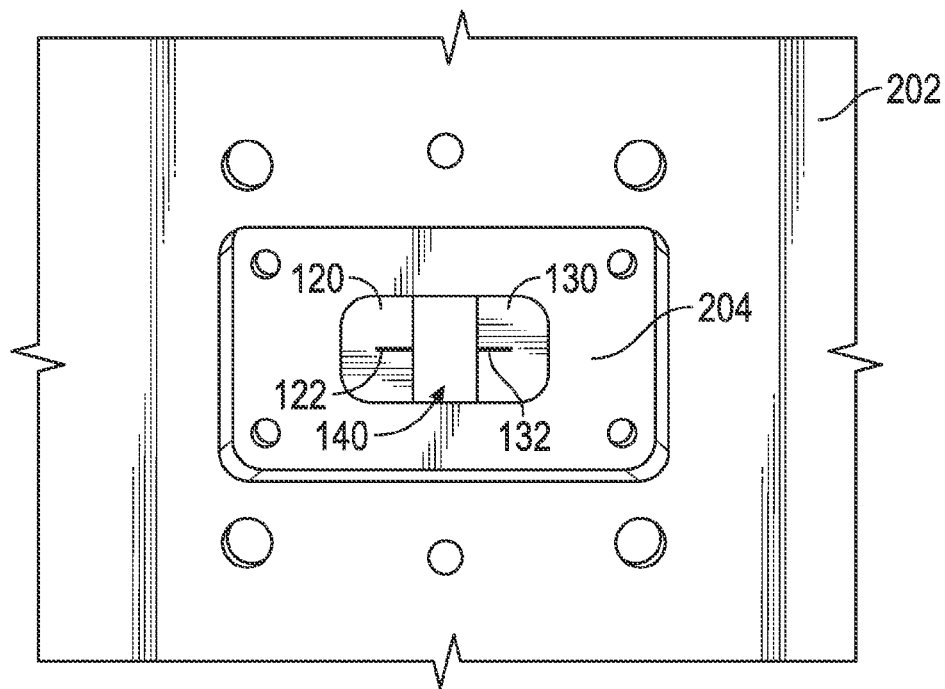
FIG. 8 is an illustration of the two adjacent turbine disks of FIG. 7, with the fixture of FIGS. 5-6 overlaying the slot location.

FIG. 7 is an illustration of the two adjacent turbine disks 120 and 130 with a scribe line 122/132 indicating a location where a slot for the first anti-rotation device 160 is to be machined. FIG. 7 is oriented looking perpendicular to the turbine shaft, as opposed to previous perspective views. Also, in FIG. 7 and subsequent figures, the turbine blades and other structure on the disks 120 and 130 are omitted for clarity. That is, for the purposes of these illustrations and the machining process they depict, the disks 120 and 130 are essentially simple cylindrical objects. FIG. 8 is an illustration of the disks 120 and 130 of FIG. 7, with the fixture 200 overlaying the slot location. Only the body 202 of the fixture 200 is shown in FIG. 8. The disks 120 and 130 are visible through the opening 206 in FIG. 8, as neither the drilling inserts 208-A/B nor the milling insert 210 are in position in the pocket 204. As shown in FIG. 8, the fixture 200 has been positioned over the gap 140 using the alignment pins 214, secured by the toggle bolts 216 in the desired location relative to the scribe line 122/132 on the disks 120 and 130, and the machining of the slot is ready to begin.

Figure 9:
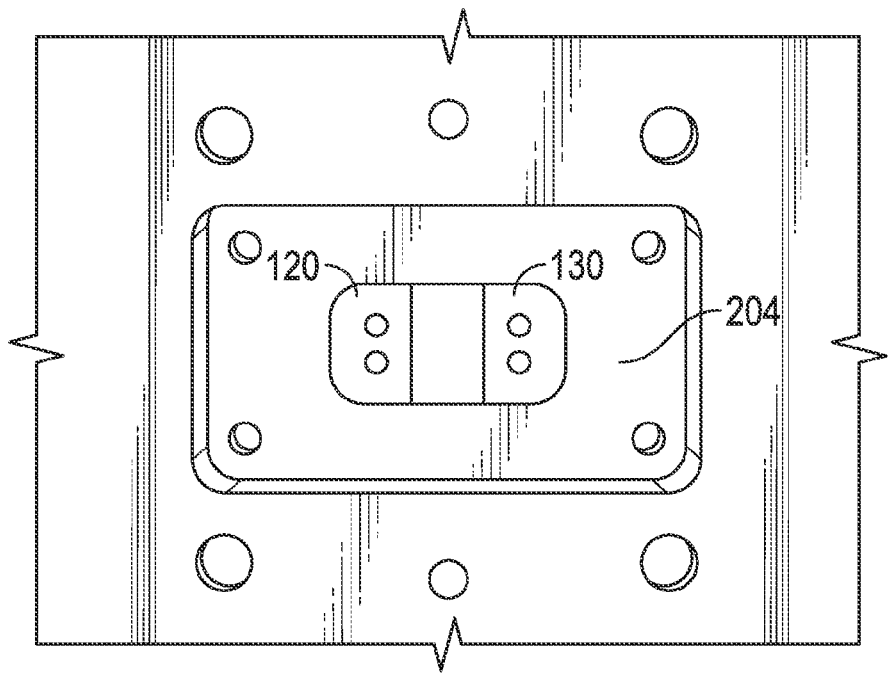
FIG. 9 is an illustration of the two adjacent turbine disks and fixture of FIG. 8, with the first step of the machining process completed.
Figure 10:
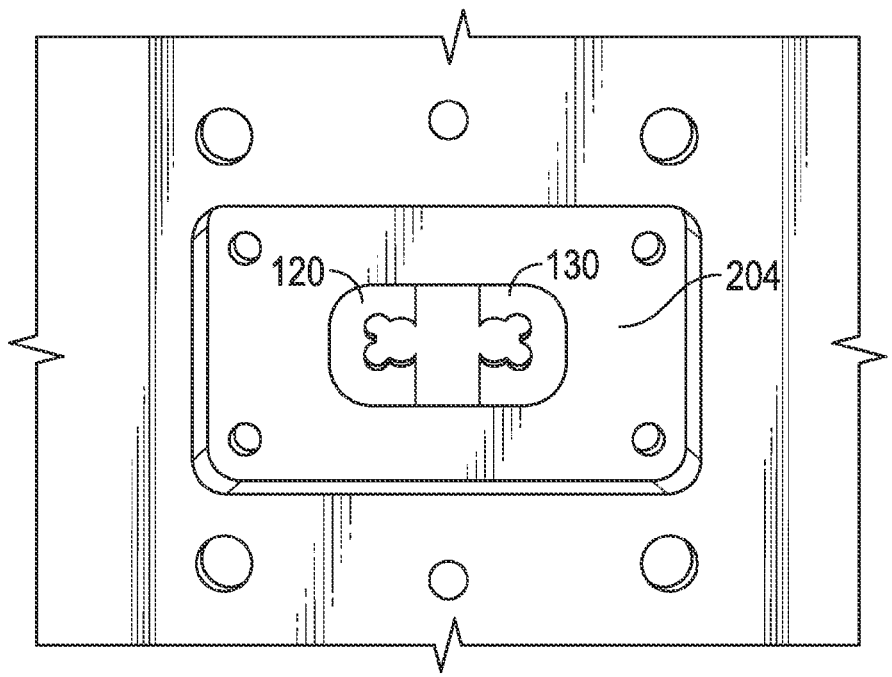
FIG. 10 is an illustration of the two adjacent turbine disks and fixture of FIG. 8, with the second step of the machining process completed.

FIG. 9 is an illustration of the turbine disks 120 and 130 and the fixture 200, with the first step of the machining process completed. The first step is the drilling of four small holes—two in each of the disks 120 and 130. The holes are drilled exactly in predetermined locations—near the corners of the slot—as dictated by the drilling insert 208-A (not shown in this figure) which has been installed in the pocket 204. FIG. 10 is an illustration of the turbine disks 120 and 130 and the fixture 200, with the second step of the machining process completed. The second step is the drilling of two more holes—one in each of the disks 120 and 130—in a location overlapping the gap 140 and the two existing holes in the respective disk, and removing much of the material to form the slot. The two holes of this second step are drilled exactly in predetermined locations as dictated by the second drilling insert 208-B (not shown in this figure) which is installed in the pocket 204 after the first drilling insert 208-A is removed following the first step of the machining process.

Figure 11:
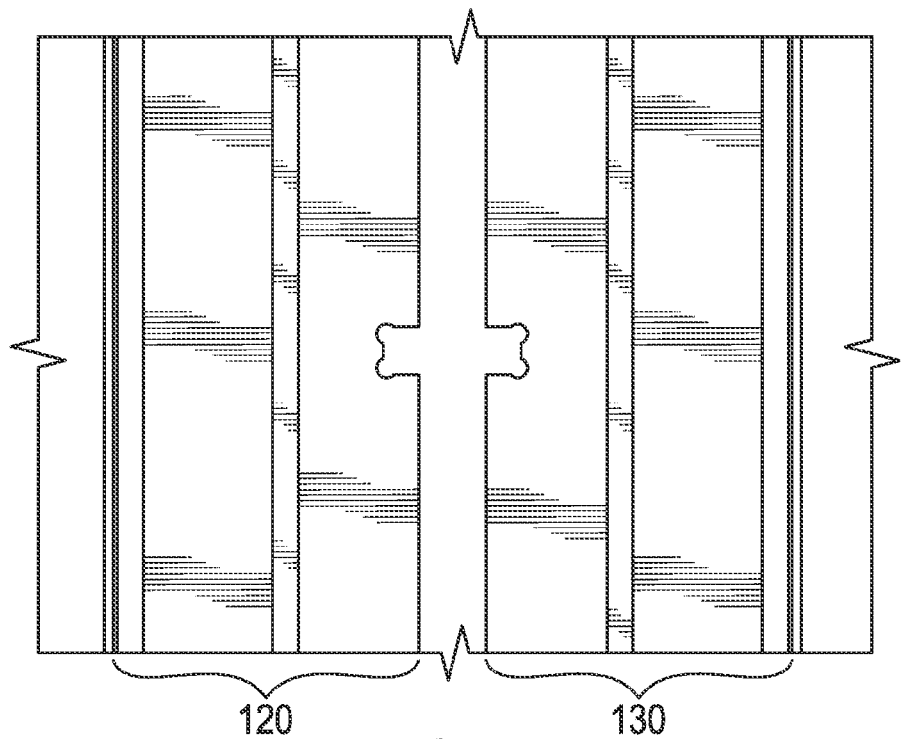
FIG. 11 is an illustration of the two adjacent turbine disks of FIG. 7, with the fixture removed, and with the third and final step of the machining process completed.

FIG. 11 is an illustration of the turbine disks 120 and 130 after a third and final step of the machining process. The third step is the milling of the slot in the disks 120 and 130, after the drilling operations of the first two steps, to its final shape. The finish milling of this third step is performed using the milling insert 210 and the associated air turbine 212, where the milling insert 210 includes a template designed to yield the desired slot shape when used with the finish cutting tool in the air turbine 212. The fixture 200 is not shown in FIG. 11, as it can be removed from the disks 120 and 130 following completion of the milling operations.

Figure 12:
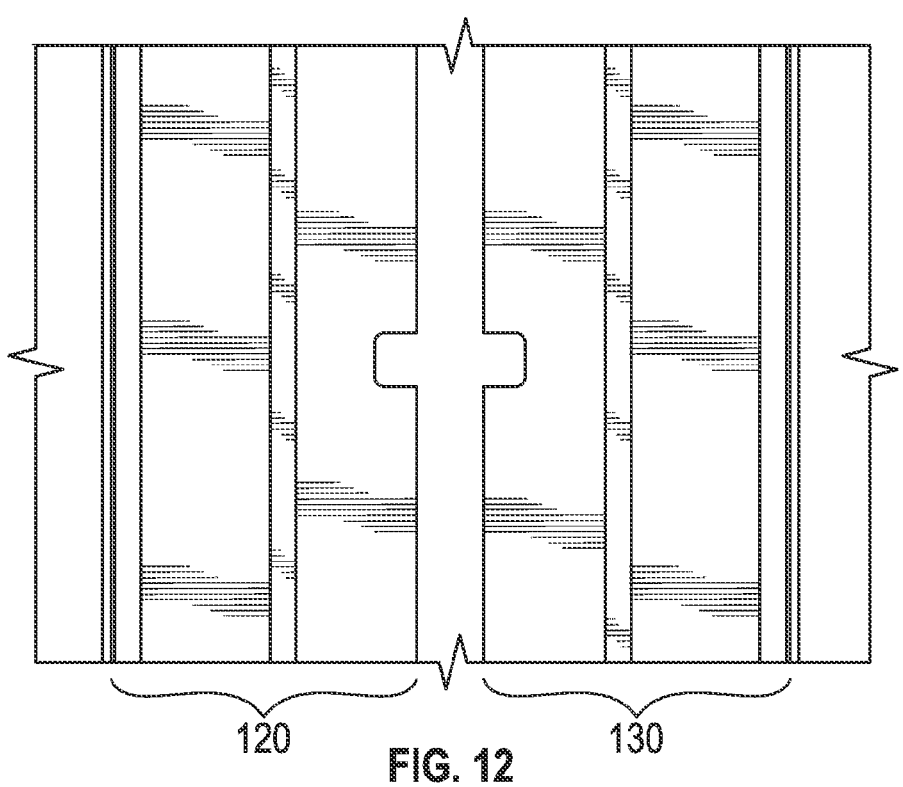
FIG. 12 is an illustration of the two adjacent turbine disks of FIG. 7, with the fixture removed, and with the third and final step of the machining process completed, showing an alternate finished slot shape to that shown in FIG. 11.

FIG. 12 is an illustration of the turbine disks 120 and 130 after the third and final step of the machining process, in an alternate slot shape embodiment. The slot as shown in FIG. 12 has a rectangular shape with traditional rounded corners, whereas the slot shown in FIG. 11 has over-rounded corners which are produced by the drilling of the four holes in the first machining step described above. It has been found that the slot shape of FIG. 11, with the over-rounded corners, is easier to mill as less tool chatter is encountered by avoiding milling all the way into the corners. Either of the slots shown in FIGS. 11 and 12 could be used, as both of the slot shapes include ample corner rounding to avoid stress concentrations.

As discussed above, the fixture 200 and its associated attachments enables the precise and repeatable machining of the slot in the disks 120 and 130, without the need to perform a rotor destack. As mentioned previously, one preferred design of the replacement bellyband 150 is comprised of four segments, with each segment including one of the anti-rotation devices 160. Thus, in order to perform a service replacement of the bellyband 150, it is necessary to machine four of the slots in the disks 120 and 130. This requires the precise location of the four slots—at identical 90° increments around the circumference of the disks 120 and 130.

Figure 13:
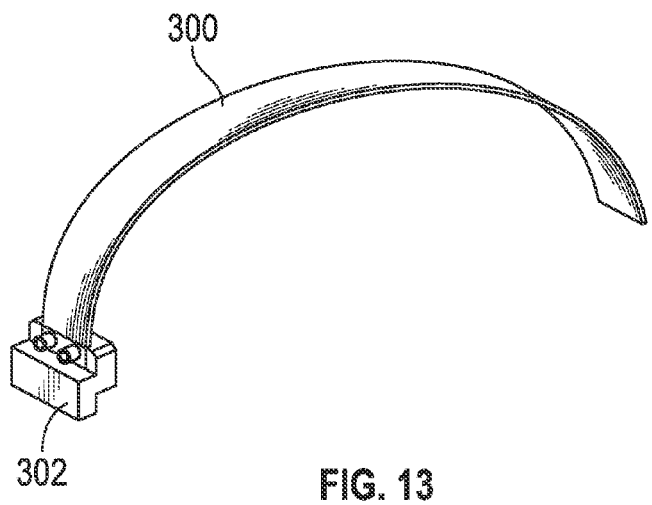
FIG. 13 is an illustration of a half-circumference measurement band which can be used to determine a position for a second slot relative to a first slot.

FIG. 13 is an illustration of a half-circumference measurement band 300 which can be used to determine a position for a second anti-rotation device slot relative to a first slot. The location of the first slot may be known as Top Dead Center (TDC), and the location of the second slot may be known as Bottom Dead Center (BDC). The half-circumference measurement band 300 includes a block 302 which fits in the first slot which has already been machined.

Figure 14:
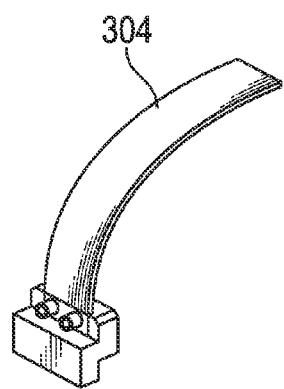
FIG. 14 is an illustration of a quarter-circumference measurement band which can be used to determine a position for a third slot relative to the first and second slots.

FIG. 14 is an illustration of a quarter-circumference measurement band 304 which can be used to determine a position for a third anti-rotation device slot relative to the first and second slots. The quarter-circumference measurement band 304 also includes the block 302 which fits in the slots which have already been machined.

Figure 15:
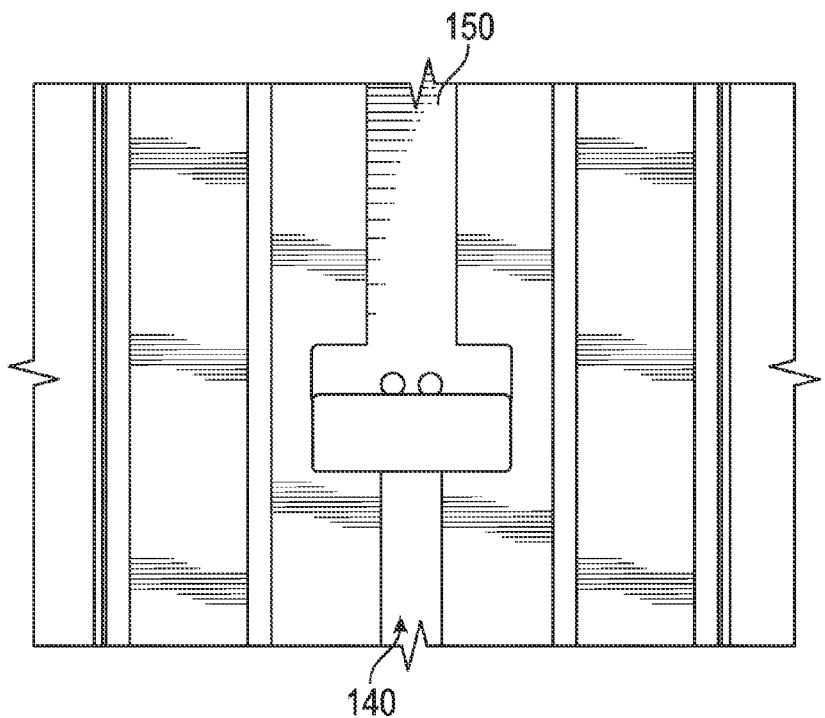
FIG. 15 is an illustration of the two adjacent turbine disks of FIGS. 7-12 after a slot has been machined, with one of the measurement bands of FIGS. 13-14 fitted in position.

FIG. 15 is an illustration of the turbine disks 120 and 130 with one of the measurement bands 300 or 304 fitted in position. The half-circumference measurement band 300 is sized, for the model of the gas turbine on which it is used, to extend exactly halfway around the circumference of the disks 120 and 130. The length of the half-circumference measurement band 300 is based on the nominal design of the disks 120 and 130. Because all parts vary within some tolerance range, it is desirable to measure both directions around the disks 120 and 130 using the half-circumference measurement band 300, marking the location of both measurements. It is expected that the two measurements will be within about a millimeter of each other, and the final location for the second slot can be established at the midpoint between the two measurements.

After establishing the location of the second slot at BDC relative to the first slot at TDC, the fixture 200 can be mounted to the disks 120 and 130, and the second slot can be machined as described previously. With the TDC and BDC slots machined, it is then necessary to locate and machine the third and fourth slots at the 90° locations around the disks 120 and 130. In order to establish the locations of the third and fourth slots, the quarter-circumference measurement band 304 is used, which is sized to extend exactly quarter-distance around the circumference of the disks 120 and 130. To establish the location of the third slot, the quarter-circumference measurement band 304 can be used to measure from both the TDC slot and the BDC slot, and any small difference in the two measurements can be halved to determine the final location of the third slot. Again, the fixture 200 can be mounted to the disks 120 and 130, and the third slot can be machined as described previously.

To establish the location of the fourth slot, the quarter-circumference measurement band 304 can be used to measure from both the TDC slot and the BDC slot in a direction opposite the third slot, and any small difference in the two measurements can be halved to determine the final location of the fourth slot. Alternately, the half-circumference measurement band 300 can be used to measure from the third slot in both directions around the disks 120 and 130, and any small difference in the two measurements can be halved to determine the final location of the fourth slot. Again, the fixture 200 can be mounted to the disks 120 and 130, and the fourth slot can be machined as described previously.

Using the tools and methods described above, four slots can be machined in the disks 120 and 130 without destacking the turbine rotor. The four slots are of extremely high quality, and are exactly located at 90° increments around the circumference of the disks 120 and 130. With the disks 120 and 130 thus prepared, installation of the replacement bellyband 150 becomes straightforward. As mentioned previously, the replacement bellyband 150 is preferably comprised of four band segments. Because the slots in the disks 120 and 130 are known to be equidistant around the disk circumference, the four band segments of the replacement bellyband 150 can all be the same length. This is in contrast to previous manual methods of disk machining, which resulted in slightly different distances between slots, thus necessitating the band segments to be cut to different lengths. Installation of the replacement bellyband 150 is completed by placing the anti-rotation device 160 of each of the four band segments in one of the four slots and attaching the ends of the band segments by any suitable means, such as welding or fastener.

Figure 16:
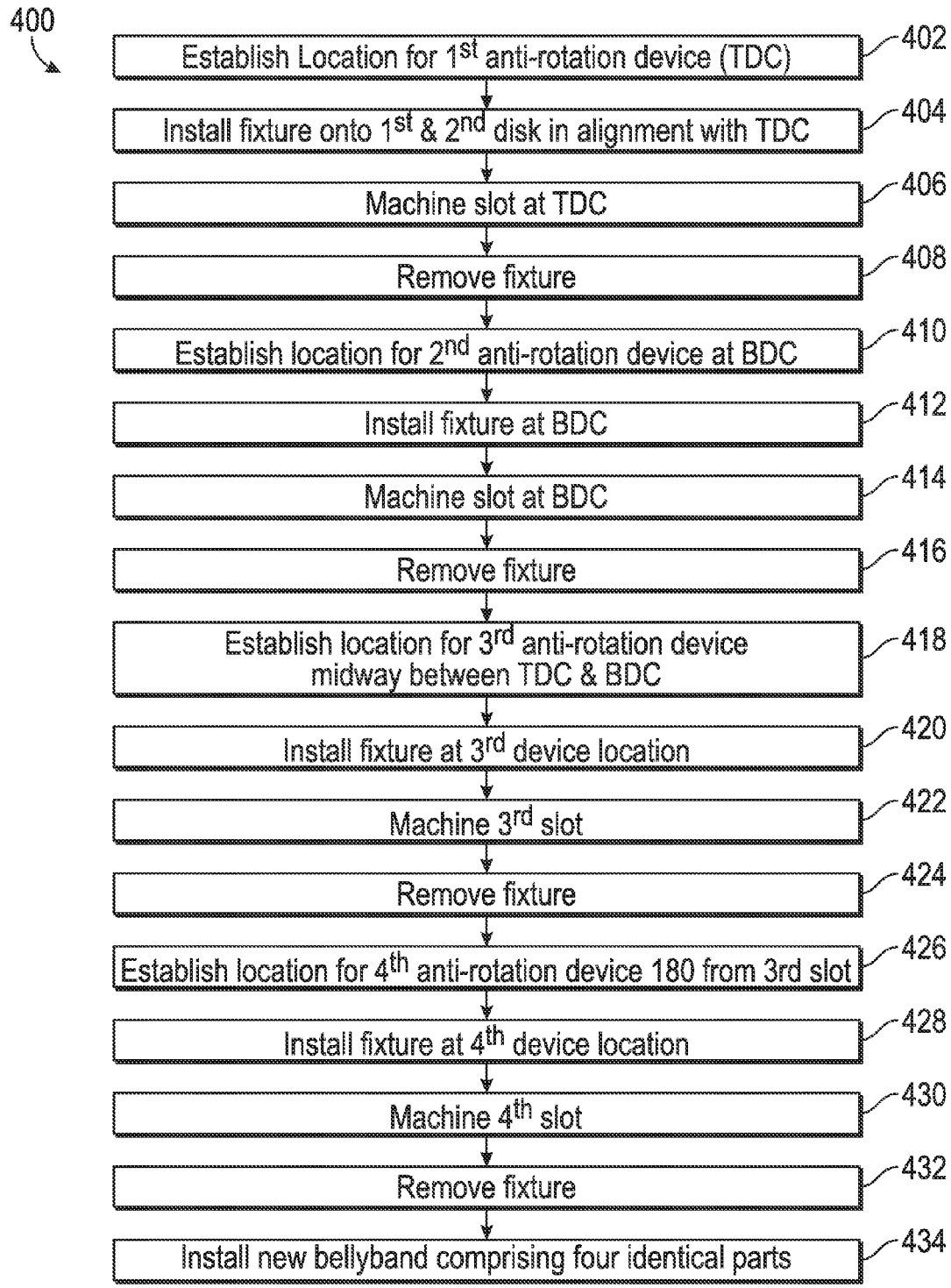
FIG. 16 is flowchart diagram of a method for improved turbine disk machining and bellyband installation.

FIG. 16 is a flowchart diagram 400 of a method for turbine disk machining and bellyband installation, using the devices and procedures described above. At box 402, the location for the first (TDC) anti-rotation device slot to be cut in the disks 120 and 130 is determined. The location of the first slot can be selected using any suitable method, such as a position relative to a feature on the disks 120 and/or 130. At box 404, the fixture 200 is mounted onto the disks 120 and 130 in alignment with the desired location of the first (TDC) slot. As discussed previously, the fixture 200 is centered on the gap 140 by the alignment pins 214, and secured to the disks 120 and 130 by the toggle bolts 216. At box 406, the TDC slot is machined in the disks 120 and 130 using the procedure described above, which involves drilling holes in prescribed locations using the drilling inserts 208-NB, and then milling out the slot to its finished shape using the milling insert 210, all of which is facilitated by the fixture 200. At box 408, after machining the TDC slot, the fixture 200 is removed from the disks 120 and 130.

At box 410, the location for the second (BDC) anti-rotation device slot to be cut in the disks 120 and 130 is determined. The location of the second slot is determined using the half-circumference measurement band 300, with the block 302 inserted into the TDC slot. As discussed previously, the measurement from TDC to BDC should be made in both directions around the disks 120 and 130, with the final BDC location splitting the difference between the two measurements. At box 412, the fixture 200 is installed at the BDC slot location. At box 414, the BDC slot is machined in the disks 120 and 130, and at box 416 the fixture 200 is removed from the BDC slot site.

At box 418, the location for the third anti-rotation device slot to be cut in the disks 120 and 130 is determined. The location of the third slot is determined using the quarter-circumference measurement band 304, with the block 302 inserted into the TDC slot or the BDC slot. As discussed previously, the measurement to the location of the third slot should be made from both TDC and BDC slots, with the final location splitting the difference between the two measurements. At box 420, the fixture 200 is installed at the third slot location. At box 422, the third slot is machined in the disks 120 and 130, and at box 424 the fixture 200 is removed from the third slot site.

At box 426, the location for the fourth anti-rotation device slot to be cut in the disks 120 and 130 is determined. The location of the fourth slot can be determined using the quarter-circumference measurement band 304, with the block 302 inserted into the TDC slot or the BDC slot, where the measurement to the location of the fourth slot should be made from both TDC and BDC slots, with the final location splitting the difference between the two measurements. The location of the fourth slot can also be determined using the half-circumference measurement band 300, with the block 302 inserted into the third slot, where the measurement to the location of the fourth slot should be made both directions around the disks 120 and 130, with the final location splitting the difference between the two measurements. At box 428, the fixture 200 is installed at the fourth slot location. At box 430, the fourth slot is machined in the disks 120 and 130, and at box 432 the fixture 200 is removed from the fourth slot site. Finally, at box 434, the replacement bellyband 150 is installed on the disks 120 and 130. The method of the flowchart 400 may be used for bellyband replacement at all locations ($1^{st}$ to $2^{nd}$ disk; $2^{nd}$ to $3^{rd}$ disk; etc.) while the turbine is out of service.

Using the devices and methods described above, bellyband replacement in a gas turbine engine is dramatically improved over previous methods. The measuring and machining devices disclosed herein not only reduce the time necessary for bellyband replacement, they also result in better quality slots in the disks, and more uniform spacing of the slots. These improvements, in turn, mean that common bellyband segments can be used, and that the replacement bellyband and the disks themselves are not subjected to excess stress. The end result is longer time between bellyband replacements and therefore less turbine downtime.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tool set for preparing two adjacent rotor disks in a gas turbine for installation of a bellyband rotor seal, said tool set comprising:
   a machining fixture configured to cut a slot into the disks, said fixture comprising a body including a recessed pocket on a top surface and an opening through the body central to the pocket, a first drilling insert configured to fit in the pocket in the body, a second drilling insert configured to fit in the pocket in the body, a milling insert configured to fit into the pocket in the body, a pair of alignment pins protruding from a bottom surface of the body, and a pair of toggle bolts passing through the body and extending beyond the bottom surface of the body, where the machining fixture is mounted onto the disks using the alignment pins and the toggle bolts and the slot is cut using the first and second drilling inserts and the milling insert in sequence;
   a half-circumference measurement band including a fitting at one end, where the fitting is sized to fit into the slot which has been cut into the disks, and the half-circumference measurement band is sized to extend halfway around a circumference of the disks; and
   a quarter-circumference measurement band including a fitting at one end, where the fitting is sized to fit into the slot which has been cut into the disks, and the quarter-circumference measurement band is sized to extend one-quarter of a distance around the circumference of the disks.

2. The tool set of claim 1 wherein the machining fixture has a size which is small enough to enable the machining fixture to be used to cut the slot without destacking the disks from a rotor of the gas turbine.

3. The tool set of claim 1 wherein the bottom surface of the body of the machining fixture has a curvature which matches a curvature of an outer surface of the disks.

4. The tool set of claim 1 wherein the first drilling insert includes drill guides for drilling two smaller holes into each of the disks, where the smaller holes are located proximate to four corners of the slot.

5. The tool set of claim 1 wherein the second drilling insert includes drill guides for drilling one larger hole into each of the disks, where the larger holes overlap the smaller holes and an edge of the gap.

6. The tool set of claim 1 wherein the milling insert includes an air turbine cutting tool which follows a template to finish machining the slot after the smaller holes and the larger holes have been drilled.

7. The tool set of claim 1 wherein the pair of alignment pins are selected to have a size which fits in the gap with minimal clearance and are screwed onto the bottom surface of the body.

8. The tool set of claim 1 wherein each of the toggle bolts includes a toggle device which can be placed through the gap between the disks, rotated a quarter turn, and tightened against an inside surface of the disks.

9. The tool set of claim 1 wherein the half-circumference measurement band is used to determine a location of a second slot which is halfway around the disks from a first slot by taking an average of a first and second measurement, where the second measurement is made by wrapping the half-circumference measurement band around the disks in a direction opposite the first measurement.

10. The tool set of claim 9 wherein the quarter-circumference measurement band is used to determine a location of a third slot which is equidistant from the first and second slots by taking an average of a measurement from the first slot and a measurement from the second slot.

11. A tool for cutting a slot into two adjacent rotor disks in a gas turbine for installation of a bellyband rotor seal, said tool comprising:
a body including a recessed pocket on a top surface and an opening through the body central to the pocket, where a bottom surface of the body has a curvature which matches a curvature of an outer surface of the disks;
a first drilling insert configured to fit in the pocket in the body, where the first drilling insert includes four drill guide holes which are used to drill a first set of holes in the disks;
a second drilling insert configured to fit in the pocket in the body, where the second drilling insert includes two drill guide holes which are used to drill a second set of holes in the disks;
a milling insert configured to fit into the pocket in the body, where the milling insert includes an air turbine cutting tool which follows a template to finish machining the slot after the first and second set of holes have been drilled;
a pair of alignment pins protruding from a bottom surface of the body; and
a pair of toggle bolts passing through the body and extending beyond the bottom surface of the body, where the machining fixture is mounted onto the disks using the alignment pins and the toggle bolts and the slot is cut using the first and second drilling inserts and the milling insert in sequence.

12. The tool of claim 11 wherein the pair of alignment pins are selected to have a size which fits in a gap between the disks with minimal clearance and are screwed onto the bottom surface of the body.

13. The tool of claim 11 wherein each of the toggle bolts includes a toggle device which can be placed through a gap between the disks, rotated a quarter turn, and tightened against an inside surface of the disks.

14. The tool of claim 11 further comprising a measurement band including a fitting at one end, said fitting being sized to fit in a slot previously cut in the disks, said measurement band being sized to establish a location of a second slot in the disks relative to a first slot in the disks, where the location of the second slot is established as an average of two measurements taken in different directions.

15. A method for replacing a bellyband rotor seal in a gas turbine, said method comprising:
establishing a location of a first slot to be cut into two adjacent rotor disks in the gas turbine;
mounting a machining fixture onto the disks at the location of the first slot, where the fixture is mounted in a position straddling a gap between the disks;
machining the first slot into the disks using tools mounted to the machining fixture;
removing the fixture from the disks;
establishing a location of a second slot to be cut into the disks, where the second slot is to be located at a position on the disks which is 180 degrees from the location of the first slot, and where the location of the second slot is determined using a half-circumference measurement band which is fitted at one end into the first slot;
mounting the machining fixture onto the disks at the location of the second slot;
machining the second slot into the disks using the tools mounted to the machining fixture;
removing the fixture from the disks;
establishing a location of a third slot to be cut into the disks, where the third slot is to be located at a position on the disks which is 90 degrees from the locations of the first and second slots, and where the location of the third slot is determined using a quarter-circumference measurement band which is fitted at one end into either the first slot or the second slot;
mounting the machining fixture onto the disks at the location of the third slot;
machining the third slot into the disks using the tools mounted to the machining fixture;
removing the fixture from the disks;
establishing a location of a fourth slot to be cut into the disks, where the fourth slot is to be located at a position on the disks which is 180 degrees from the location of the third slot, and where the location of the fourth slot is determined using the half-circumference measurement band which is fitted at one end into the third slot;
mounting the machining fixture onto the disks at the location of the fourth slot;
machining the fourth slot into the disks using the tools mounted to the machining fixture;
removing the fixture from the disks; and
installing the bellyband rotor seal on the disks, where the bellyband rotor seal includes four identical band segments, and each band segment includes an anti-rotation device which fits into one of the slots in the disks.

16. The method of claim 15 wherein mounting the machining fixture onto the disks includes using a pair of alignment pins to align the fixture with the gap between the disks, where the alignment pins protrude from a bottom surface of the fixture, and where the alignment pins are selected to fit in the gap with minimal clearance.

17. The method of claim 15 wherein mounting the machining fixture onto the disks includes using a pair of toggle bolts to secure the fixture to the disks, where the toggle bolts each include a toggle device which can be placed through the gap between the disks, rotated a quarter turn, and tightened against an inside surface of the disks.

18. The method of claim 15 wherein the tools mounted to the machining fixture include first and second drilling inserts which fit in a prescribed position in the fixture, where the drilling inserts include drill guides to facilitate drilling a plurality of holes in the disks.

19. The method of claim 15 wherein the tools mounted to the machining fixture include a milling insert which fits in a prescribed position in the fixture, where the milling insert includes an air turbine cutting tool which follows a template to cut the slot.

20. The method of claim 15 wherein establishing a location of a second slot includes taking a measurement in a first direction and a second direction around the disks from the first slot using the half-circumference measurement band, and taking an average of the measurements in the first direction and the second direction.

* * * * *